W. S. SMITH.
WEIGHING SCALE.
APPLICATION FILED OCT. 12, 1908.

992,919.

Patented May 23, 1911.

2 SHEETS—SHEET 1.

Witnesses
Benj. Finckel
Ada G. Gambs

Inventor
Walter Standish Smith
by Finard & Finard
his Attorneys

W. S. SMITH.
WEIGHING SCALE.
APPLICATION FILED OCT. 12, 1908.
992,919.
Patented May 23, 1911.
2 SHEETS—SHEET 2.
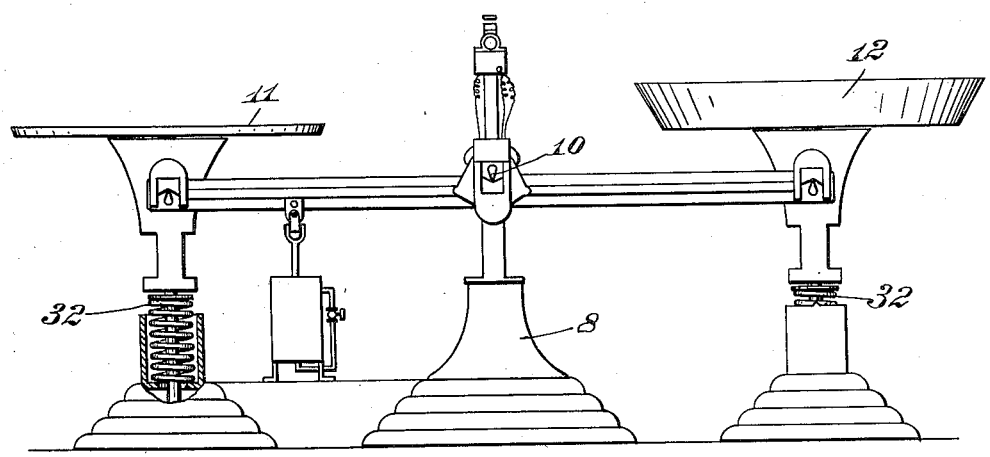
Fig. 7.
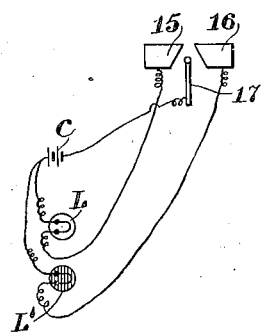
Fig. 5.ᵃ
Witnesses
Inventor
Walter Standish Smith
his Attorneys

UNITED STATES PATENT OFFICE.

WALTER STANDISH SMITH, OF COLUMBUS, OHIO, ASSIGNOR TO THE COLUMBUS ELECTRIC SCALE COMPANY, OF COLUMBUS, OHIO, A CORPORATION OF OHIO.

WEIGHING-SCALE.

992,919.  Specification of Letters Patent.  Patented May 23, 1911.

Application filed October 12, 1908. Serial No. 457,327.

*To all whom it may concern:*

Be it known that I, WALTER STANDISH SMITH, a citizen of the United States, residing at Columbus, in the county of Franklin and State of Ohio, have invented a certain new and useful Improvement in Weighing-Scales, of which the following is a specification.

The chief object of this invention is to facilitate and make more accurate the weighing of merchandise, and to this end the invention consists primarily in the provision of improved electrically operated means whereby a prolonged signal is produced while the weighing beam in the weighing operation is approaching the balanced state and a separate signal if it passes said state. But the exact scope of the invention is to be gathered from the following particular description and claims.

Figure 1:
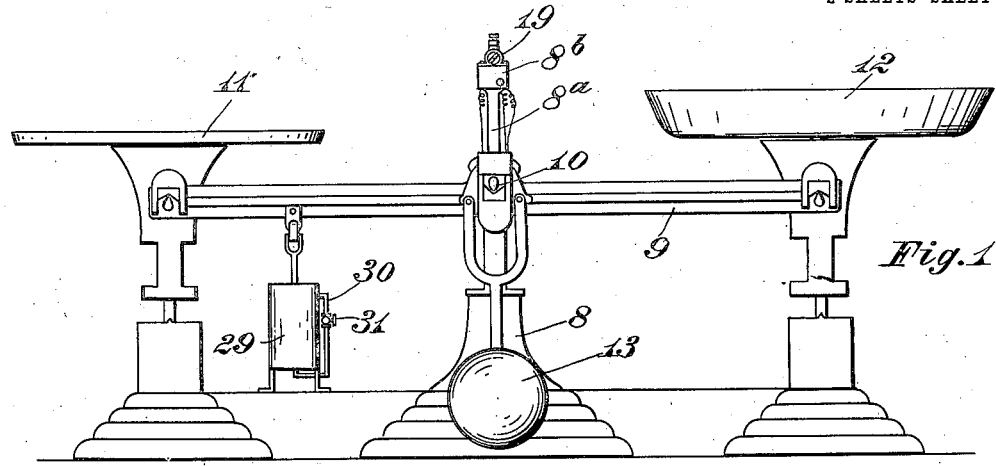
Figure 2:
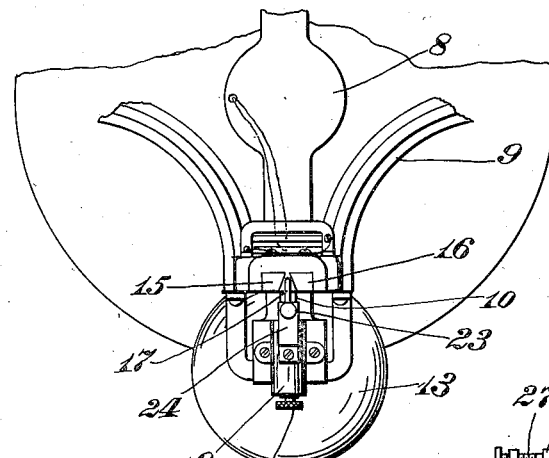
Figure 6:
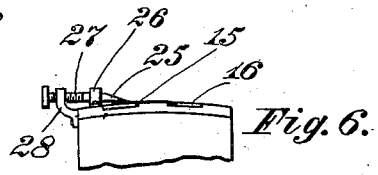
Figure 3:
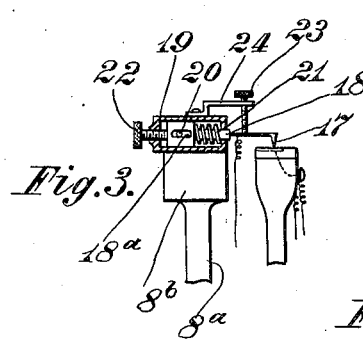
Figure 4:
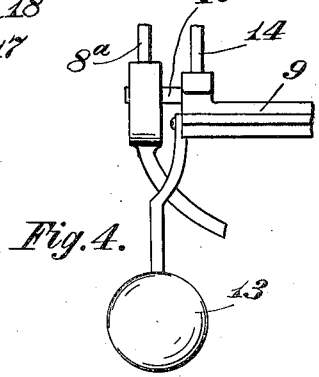
Figure 5:
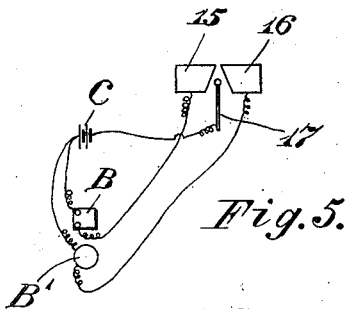

In the accompanying drawings—Figure 1 is a side elevation of an ordinary even balance scale as it appears equipped with my invention. Fig. 2 is a plan view, on a larger scale, of the electrical circuit closing and opening devices. Fig. 3 is a side view of said devices with parts in section. Fig. 4 is a detail in side view to illustrate the construction of the posts that carry the stationary and movable contacts. Fig. 5 is a diagram, chiefly symbolical, to illustrate the electrical circuits. Fig. 5ª is a diagram like Fig. 5 illustrating electric lamps instead of a bell and buzzer. Fig. 6 is a detail showing means for varying the duration of the under-weight signal. Fig. 7 shows my invention as applied to a scale having springs for tending to project the beam toward the balanced state.

On the views 8 designates the usual base, and 9 the usual beam. The beam is fulcrumed by means of the usual knife-edge studs or trunnions 10 on bearings in standards 8ª rising from the base.

11 designates the usual pan for receiving the weights, and 12 the pan for receiving the commodities to be weighed.

In Figs. 1, 2 and 3 is shown a weight 13 rigidly secured to the beam, the center of gravity of which weight is in a vertical plane with the fulcrum of the beam; but said weight lies below the horizontal line of the fulcrum of the beam or so that it shall tend to cause the beam normally to assume the horizontal position.

Rising from and rigid with the beam is a post 14, the upper end of which is of insulating material and has set in its upper curved face two small pieces 15 and 16 of brass or other suitable conducting material presenting extended contacting surfaces, said pieces having their adjacent edges inclined to form or expose between them a V-shaped surface of the insulating material. The upper surface of the post 14 is curved on an arc of a circle having as its center the axis of motion of the beam so as to permit a stationary contact, hereinafter described, to bear on it with a substantially uniform pressure at different points. The plate 15 is on the weight-receiving side of the beam and the plate 16 on the commodity-receiving side.

17 designates the stationary contact. This contact is mounted on the upper end of a post or extension 8ᵇ of the standard 8ª. The stationary contact is preferably made adjustable both as to the pressure it exerts on the moving contacts 15 and 16, and as to its position in a horizontal line with reference to said moving contacts. For these purposes the shank of the contact is secured to a slug 18 that slides in a barrel 19, a stationary cross pin 20 that extends through the barrel, and a slot 18ª in the slug being provided to prevent the slug and contact from turning. And the slug and contact are pressed outward by a spring 21 in the barrel against the end of a set screw 22, which latter can be regulated to fix the contact in the desired position. To regulate the pressure of the contact 17 a set screw 23 threaded in a small bracket 24 secured to the upper side of the barrel 19 is employed.

The wiring is illustrated in Fig. 5. In said view a line or conductor runs from the movable contact 15 through a buzzer B to one electrode of a cell or other generator C of current, while a line runs from the movable contact 16 through a bell B' to the same electrode of the said cell or generator C. The opposite electrode of the cell or generator C is connected with the stationary contact 17. The sounds of the buzzer and bell preferably differ quite distinctly from each other. The buzzer, in the arrangement shown, therefore indicates under weight in the commodity pan and the bell over or excess weight in that pan. The duration of the signal indicating under weight under like conditions can be varied by adjusting the contact 17 inward or outward. If a more extended or earlier warning that a state of equilibrium is being approached is desired, the contact 17 is adjusted inward so as to cause said contact to contact with more of the piece 15 as that piece is carried under it. For illustration in weighing sugar, the flow of which from a scoop can be nicely controlled, the sounding of the alarm need not be given so early as when some other commodity, the addition of which to the pan, cannot be so closely controlled. Because of the construction shown and described a prolonged signal is given while the scale beam is approaching the balanced state and thus time is allowed to properly restrict the supply to the commodity pan.

In Fig. 6 I show another means for controlling the underweight. Said means consists in the provision of piece of insulating material 25, having its upper face beveled toward the V-shaped space between the contact pieces 15 and 16, said piece 25 being slidable, and guided by a yoke 26, and having suitably connected or swiveled with its outer edge a set screw 27 threaded in a bracket 28. By turning the screw 27 more or less of the piece 15 can be covered and the time of contact of the member 17 with the piece so varied.

To control the speed of oscillation of the beam I propose to employ a dash pot 29 containing glycerin, oil or other liquid. In the dash pot is a tight fitting piston and the upper and lower ends of the pot are connected by an external tube 30 in which is a valve 31 to control the flow of the liquid from one end to the other when subjected to action of the piston. Instead of the pendulous weight I can employ springs 32 under each pan, as seen in Fig. 7, to prevent a too violent descent of the pan, and also by the reaction or urging of the compressed spring make the action of the commodity side of the beam more sensitive to the addition of weight, especially during the first part of the time the commodity is supplied.

By the expression "balanced state" I mean that position of the beam when the contact 17 rests on the insulating material between the contacts 15 and 16, it being understood that such position necessarily in practice most frequently only approximates to the true balanced state.

If desired the electrodes or contact pieces 15 and 16 may both be of such dimensions as to move beyond the contact 17 when the beam is down to the limit of its movement at either side, but it is more especially desirable that the electrode 16 be beyond the contact 17 when the weight pan is at the limit of its downward movement, because, ordinarily, in practice, a weight is left on the weight pan and in this position of the beam it is desirable that the signal be cut out and the apparatus left silent. In my apparatus, therefore, the signal is silent when the weight end of the scale beam is down. It is also silent when the scale beam is in the balanced state. The signal is therefore interjected in the movement of the beam from the position of rest of the beam with its weight end down to the position of the balanced state, and this signal being a prolonged one cautions the weigher and affords him time to diminish and regulate the quantity of material he is supplying to the commodity pan. If no weight is on the weight pan the pendulum urges the beam to the balanced and silent state of the apparatus.

Instead of a buzzer and bell I can employ in their places differently colored lights L, L' to form the signals as clearly indicated in Fig. 5ª.

What I claim and desire to secure by Letters Patent is:

1. In combination with a weighing device including a beam, an electric circuit closing member comprising an insulating body containing two metallic pieces spaced apart with insulating material between them and having exposed surfaces coinciding with the surface of the insulating body, the surfaces of both the metallic pieces and the insulating material being smooth, and a second circuit closing member to coöperate with the first mentioned member consisting of an elastic metallic device to bear with a yielding pressure on the said first mentioned circuit closing member, one of said circuit closing members being connected with the beam near its fulcrum to be rocked by the beam in the weighing operation, and means for effecting a signal when the said elastic contact member is in contact with said metallic pieces of the first named member to indicate underweight and overweight respectively, said contacts being also constructed and located to automatically cause the opening of the electrical circuit when the beam is depressed by a weight at the weight-receiving end, substantially as described.

2. In combination with a weighing device including a beam, an electric circuit closing member comprising an insulating body containing two metallic pieces spaced apart with a V-shaped portion of insulating material between them and having exposed surfaces coinciding with the surface of the insulating body, the surfaces of both being smooth, and a second circuit closing member to coöperate with that first mentioned member consisting of an elastic metallic device to bear with a yielding pressure on the said first mentioned circuit closing member, one of said circuit closing members being adjustable with reference to the other and one of said members being connected with the beam near its fulcrum to be rocked by the beam in the weighing operation, and means for effecting a signal when the said elastic contact member is in contact with said metallic pieces of the first named member to indicate underweight and overweight respectively, substantially as described.

3. In combination with a weighing device including a beam, an electric circuit closing member comprising an insulating body containing two metallic pieces spaced apart and having exposed surfaces coinciding with the surface of the insulating body, and the surfaces of the insulating body and its said contained metallic pieces being smooth and formed on an arc concentric with the axis of movement of the beam, a second circuit closing member consisting of an elastic metallic device to bear with a yielding pressure on said first mentioned circuit closing member, and means for effecting a signal when the elastic contact member is in contact with said metallic pieces of the first named member to indicate underweight and overweight respectively, said contacts being also constructed and located to automatically cause the opening of the electrical circuit when the beam is depressed by a weight at the weight-receiving end, substantially as described.

4. The combination with a weighing device including a beam, of electrically operated means for producing a signal when the beam is out of the balanced state, including a stationary contact and a moving contact, and means for varying the area of the exposed portion of the moving contact.

5. In combination with a weighing device including a base and a beam, a pair of circuit closing contact pieces on one of said parts, and a coöperating circuit closing contact on the other, the members of the pair of contacts being separated from each other at the point where the coöperating contact is when the beam is at a state of balance, and said coöperating circuit closing contact being constructed and located to be out of contact with each of the members of the pair of contacts when the beam is at a state of balance and also when the beam is depressed by a measuring weight at the weight-receiving end and suitable electric circuits and signaling devices for causing a signal for underweight as the beam approaches the balanced state, there being a state of silence at the balanced state and when the beam is depressed at its weight-receiving end, and a signal when the beam passes the balanced state due to overweight.

6. In combination with a weighing device including a base and a beam, a pair of circuit closing contact pieces on one of said parts, and a coöperating circuit closing contact on the other, the members of the pair of contacts being separated from each other at the point where the coöperating contact is when the beam is at a state of balance and said coöperating contact being constructed and located to be out of contact with each of the members of the pair of contacts when the beam is at a state of balance and also when the beam is depressed by a measuring weight at the weight receiving end, and suitable electric-circuits and signaling devices for causing a signal for underweight as the beam approaches the balanced state and a signal of different character from that indicating underweight when the beam passes the balanced state due to overweight.

WALTER STANDISH SMITH.

Witnesses:
 BENJAMIN FINCKEL,
 ADA G. GAMBS.